Figure 1:
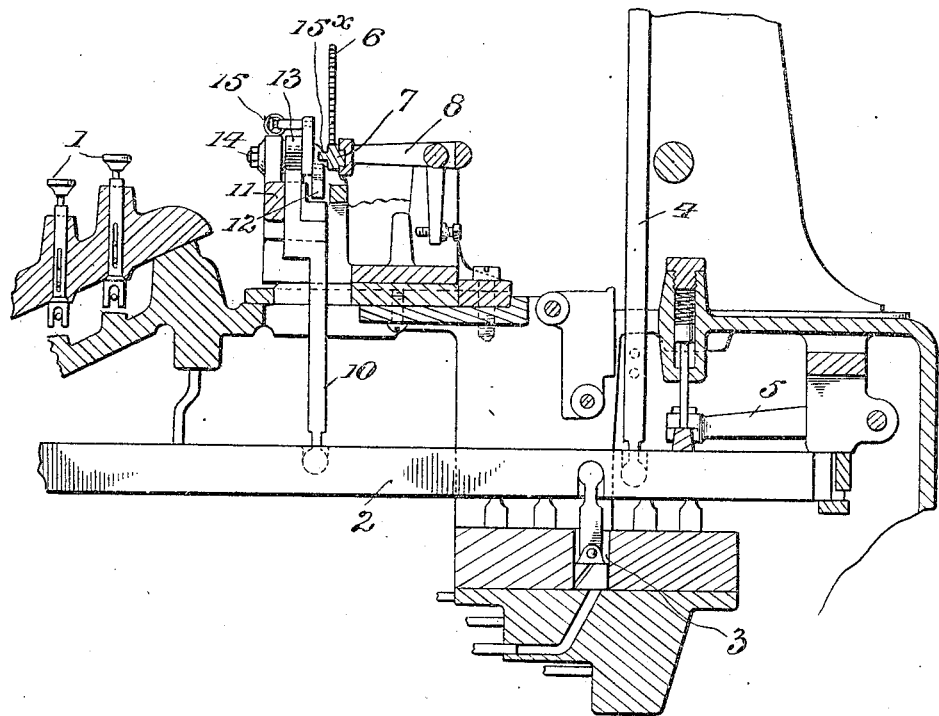

F. H. PIERPONT.
UNITS MEASURING MECHANISM FOR COMPOSING MACHINES.
APPLICATION FILED DEC. 8, 1908.

952,631.

Patented Mar. 22, 1910.

3 SHEETS—SHEET 1.

Witnesses
Thomas Durant

Inventor
Frank H. Pierpont
By Church & Church
his Attorneys

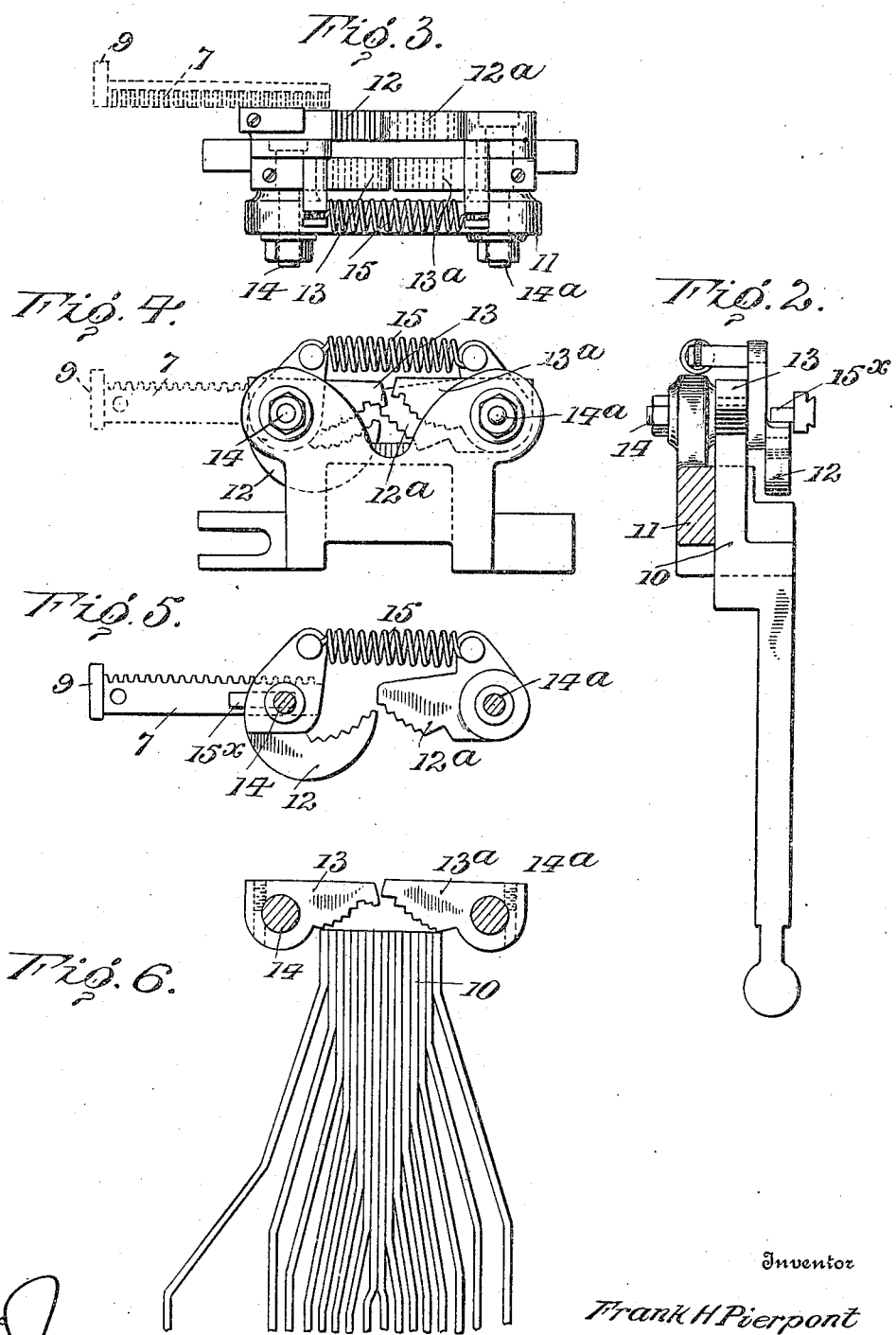

F. H. PIERPONT.
UNITS MEASURING MECHANISM FOR COMPOSING MACHINES.
APPLICATION FILED DEC. 8, 1908.
952,631.
Patented Mar. 22, 1910.
3 SHEETS—SHEET 3.
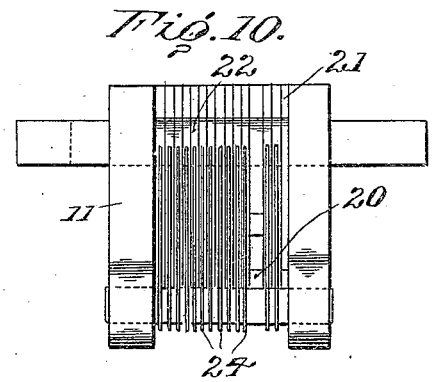
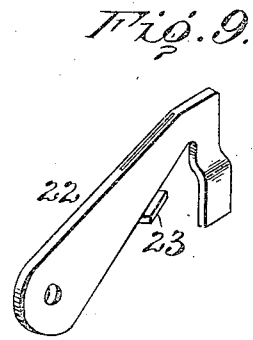
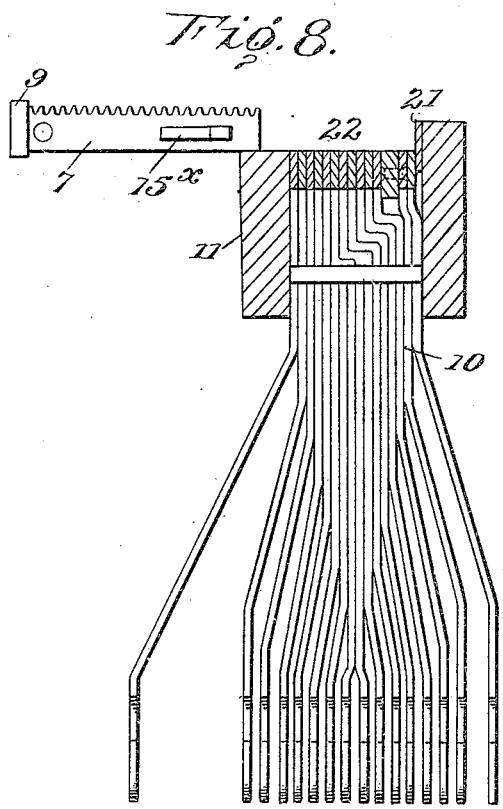
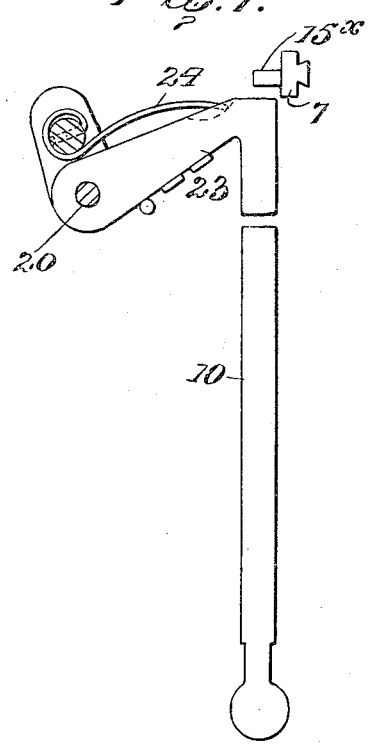
Witnesses
Inventor
Frank H. Pierpont
By Church & Church
his Attorneys

UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

UNITS-MEASURING MECHANISM FOR COMPOSING-MACHINES.

952,631.  Specification of Letters Patent.  Patented Mar. 22, 1910.

Application filed December 8, 1908. Serial No. 466,509.

*To all whom it may concern:*

Be it known that I, FRANK HINMAN PIERPONT, temporarily of Horley, county of Surrey, England, have invented a certain new and useful Improvement in Units-Measuring Mechanism for Composing-Machines; and I do hereby declare the following to be a full, clear, and exact description of the same, reference being had to the accompanying drawings, forming a part of this specification, and to the figures of reference marked thereon.

This invention relates to that class of pattern or controller composing machines wherein a line measuring mechanism is employed to register the space value of each signal as set up or composed, as well as the aggregate space occupied by all the composed signals contained in each line, and it is more particularly directed to the mechanism for registering the space value of individual signals as produced, composed or set up.

The registering devices heretofore commonly employed constituted more or less permanent and integral elements of the composing machine and included a movable measuring member such as the units-rack, and a plurality of stops or bars serially arranged and each coupled directly or indirectly with one or more of the actuating members of the signal producing or assembling devices. The stops or bars were spaced to represent different degrees of movement of the measuring member and were projected, one at a time, into the path of said member, to admeasure the advance of the latter in accordance with the space value of the signal at the time set up.

The intervals between successive stops represent fixed increments of measurement, but inasmuch as the proportion between the widths, as well as the number of characters, is not a constant but varies in different fonts, lay-outs and arrangements, it results that a measuring mechanism adjusted for one font or lay-out is incompetent to deal with another employing a different allocation of characters, and therefore of units, unless and until it has been taken apart and altered to accord with the new scheme of distribution. Attempts have been made to remedy this defect by the introduction of interchangeable coupling units between the admeasuring stops and the actuating devices of the signal selecting or composing mechanism, an example whereof is to be found in Patent No. 828,451, but this involves considerable complexity and some modification of the general structure.

Now the principal object of the present invention is to provide a complete or self contained serial stop or admeasuring unit one which can be interchangeably applied to the composing machine without reorganization or rearrangement of its parts, to which end said invention consists in the construction, combination and arrangement of devices hereinafter described, the novel features being pointed out in the claims.

In the accompanying drawings illustrating preferred forms of application of the invention—Figure 1 is a partial sectional elevation of a composing machine with a serial stop admeasuring unit applied thereto. Fig. 2 is an end elevation of the serial stop admeasuring unit, with the actuating bars and measuring member or units bar in correlation therewith. Fig. 3 is a top plan view and Fig. 4 is a front elevation of the serial stop admeasuring unit detached, the units rack being indicated by dotted lines. Fig. 5 is a diagrammatic view of the gaging members and units rack. Fig. 6 is a sectional elevation of the admeasuring unit showing the stepped actuating levers or key pieces and the series of actuating bars or connections. Fig. 7 is an end elevation, partly in section and Fig. 8 a front elevation, also partly in section, of a modified form of serial stop admeasuring unit. Fig. 9 is a perspective view of one of the stop bars. Fig. 10 is a top plan view of the unit Fig. 7.

The same numerals designate like parts in the several views.

For purposes of illustration the improvements are shown applied to the record strip composing machine of Patent No. 654,115, containing the improvements of Patent No. 828,449. It will suffice for present purposes to designate some of the principal elements of said composing machine with which the present improvements are more directly associated, such as the series of valved finger keys 1, denoting the various characters of the font; the series of punch levers 2, each provided with a motor 3 and punch bar 4; rocking bar 5 controlling the paper feed mechanism (not shown); units wheel 6; units-rack 7; units-rack carrier 8; and units-rack stop or zero gage 9.

The particular variety of pattern which this machine is designed to produce or set up is a perforated strip, usually of paper, the perforations being variously disposed on successive transverse lines, each perforation or combination of perforations occurring on one line constituting a signal representing a particular type or action to be performed. The signals are produced by the punches, the latter being coupled up with and controlled by the keys in such manner that each key will actuate the punch or punches corresponding with the character or action represented by the key. The keys are arranged in column and line series and the punches include two groups each representing successive stages of adjustment in one of two directions. Each column of keys controls the corresponding punch of one group and each line of keys the corresponding punch of the other group. Heretofore the column punches were each coupled with one of a group of serially arranged admeasuring stop-bars adapted to be separately projected into the path of the units measuring and transmitting member of the line measuring mechanism, i. e., the units rack 7, and all the characters of the same set-wise dimension were distributed among the keys of the column whose stop-bar coincided in measure with that of the characters represented, as illustrated in the aforesaid Patent 654,115, wherein the stop-bars are connected directly to the punch levers of the column group of punches. It so happens, however, that the proportion between the number of characters and widths is by no means a constant, but varies with different fonts, layouts and arrangements, hence such a composing machine when adjusted for one arrangement or lay-out is incompetent to deal with another employing a different allocation of characters, and, therefore, of units, unless and until it has been taken apart and changed or altered to accord with the new scheme of distribution.

It not infrequently occurs that the layout contains two or three times the number of characters of the same set-wise dimensions as there are keys in a column rendering it necessary that a single stop-bar should be coupled with two or three of the column punches, the number and disposition varying with different arrangements. To meet these and similar conditions involving changes in the unit measurements assigned to the keys, a detachable coupling unit was devised for interposition between the stop bars and keys as illustrated in Patent 828,451. This involves not only structural changes in the composing machine itself, including the abandonment of the direct connection between the stop-bars and punch levers, but also the addition of numerous parts, requiring corresponding structural modifications.

Now, according to the present invention, the direct connections or transmitters 10 of the composing machine of Patent 654,115, are retained, but instead of being arranged and proportioned to project into the path of the units-rack, they are shortened and utilized merely as transmitting agents between the punch levers of the dimensioning group of punches and a detachable or variable admeasuring unit, of which latter two varieties are shown.

Referring to the form of embodiment illustrated in Figs. 1 to 6 inclusive 11 is a frame adapted to be readily attached and removed from the composing machine frame after the manner of the stop-bar jaw frame of the prior machines. Upon this frame and removable therewith is the units gaging device in the form of a stepped gaging member 12 and a key piece 13, the former coöperating with the units rack and the latter with the connections 10. The steps or shoulders of gaging member 12 are graduated to correspond with unit movements of the units rack, that is to say, the degree of displacement between adjacent steps or shoulders is equal to a one unit advance of the units rack. Gaging member 12 is fast on a shaft or bolt 14 turning in bearings in frame 11 and stands normally to one side and out of the path of a projection $15^{\times}$ carried by the units rack and adapted to engage whichever of the stepped gaging shoulders is presented to it in consequence of a partial rotation of its shaft 14. The key piece 13, adjustably and removably attached to shaft 14, overlies the upper ends of transmitters 10, and it too is stepped or notched to gage the motion imparted to gaging member 12 by the several transmitters.

In practice the parts are so adjusted and proportioned that the first step or shoulder of gaging member 12, in this instance the shoulder nearest the shaft 14, when presented in the path of the units-rack will arrest the latter, after it has traveled a predetermined distance, usually four units, and each succeeding shoulder when presented will measure a uniform increase of one unit in the traverse of the units rack.

The several connections or transmitters 10 are permitted a uniform degree of motion, hence the one nearest the axis of the key piece will throw the latter and the connected gaging member the maximum distance, thereby presenting the first or four unit shoulder in the path of the units rack, and, the leverage being properly calculated, the second transmitter 10 will present the second shoulder, thereby increasing the excursion of the units-rack by one unit, and so on throughout the series, each succeeding transmitter presenting a shoulder whose value is one or more units greater than the next preceding.

It is obvious that by varying the angular relation of the seats or bearings on the key-piece 13 with which the several transmitters 10 contact, the degree of motion communicated to the gaging member 12 can be correspondingly varied, so that any one or more of the transmitters 10 corresponding with the column punches can be caused to present any one of the series of gaging shoulders to the units rack. Thus, if characters of a given width are distributed among the keys of two or more columns, the key piece may be so shaped at the bearings or seats where the transmitters 10 corresponding with said columns of keys engage that a uniform degree of motion will be imparted to the gaging member 12, thereby presenting the same gaging shoulder whenever a key of either column is depressed to record or set up a signal; and if it were, for any reason, desired to locate a column of keys or characters between adjacent columns of relatively higher or lower unit value, this could be provided for by correspondingly changing the angular relation of the point of contact on the key piece when the transmitter 10 pertaining to the column engages to shift the gaging member.

Although a single gaging member and associated keypiece such as described might serve providing the degree of motion permitted the transmitter 10 was sufficient to include the several stages of adjustment required, the construction shown wherein two gaging members and connected key pieces are associated together in the same frame is preferred as adapted without further modification to existing conditions, and as affording sufficient intervals for the use of relatively wide shoulders on the gaging member. In this case the two gaging members 12 and 12ª project in relatively opposite directions from their respective shafts 14, 14ª as do the key pieces 13, 13ª, one half of the sixteen transmitters 10 being arranged to engage key piece 13 and the other half, key piece 13ª. Gaging member 12, or that nearer the units rack, is stepped on its upper edge, the steps representing the lower series of units, say from four to nine inclusive, while the other gaging member 12ª, is stepped on its lower face or edge, its steps representing the larger units, say from ten to fifteen inclusive and eighteen, the last represented by the deep notch nearest the shaft. A tension spring 15 connecting the two gaging members tends to return them to and retain them in normal position as shown in Fig. 5. When either gaging member is moved to position it presents a solid and rigid abutment for admeasuring the movements of the units rack, and by a substitution of these self contained admeasuring units and without further change or modification in the equipment, the unit measurements recorded for the several columns of keys can be changed or varied as required.

In the example given gaging member 12 contains six gaging shoulders of which the last one is controlled by three of the eight transmitters 10, while gaging member 12ª contains seven gaging shoulders of which the one nearest the units rack is controlled by two transmitters 10, and as there are fifteen columns of keys (the first of the series of transmitters being controlled by the justifying space key alone) the layout represented will contain three columns of nine units each, two of ten units, and ten of five, six, seven, eight, twelve, thirteen, fourteen, fifteen and eighteen units, respectively.

It is obvious that by a substitution of gaging member or key pieces, or both, an admeasuring unit adapted to a different layout or allocation of unit values can be provided and quickly substituted for that shown, and without further change or adjustment of the components of the composing machine.

In the modification represented in Figs. 7 to 10, inclusive, the frame 11 is extended to form bearings for a shaft 20 and a final seat or step 21, the latter in line with the projection on the units rack. Upon shaft 20 is mounted a plurality of stop bars 22 arranged in series between the units rack and seat 21 and overlying the series of transmitters 10. Each stop bar 22 is provided with an arm or projection 23 underlying the next stop bar of higher value in the series, so that when elevated into the path of the units rack it will cause a corresponding movement of all the stop-bars situated between it and the seat 21, thereby presenting a rigid abutment to receive the impact of the units rack and admeasure the advance of the latter. Such of the stop bars 22 as are to be operated upon by a single transmitter 10 are in register therewith, and where two or more of said transmitters representing the same unit values, are required to act upon a single stop bar 22 of corresponding value, the engaging face of the latter is extended laterally to cover the two or more transmitters, as illustrated in Fig. 8. The end stop bar is provided with a spring 24 for returning it to normal position. In this illustration the first five transmitters 10 engage single stop bars, of four, five, six, seven and eight units respectively; the next three transmitters engage the nine units stop bar; the two following, the ten units stop-bar; the next five the eleven, twelve, thirteen, fourteen and fifteen units stop bars, respectively, and the last, the eighteen units stop-bar.

Having thus described my invention, what I claim as new and desire to secure by Letters Patent, is:

1. In a composing machine such as described provided with key controlled signal designating devices including a series of punch levers, and a line measuring mechanism including a units-rack, and in combination therewith, a series of transmitters each directly coupled with a punch-lever, and a self-contained detachable admeasuring mechanism or unit interposed between said series of transmitters and units-rack.

2. In a composing machine such as described provided with a units-rack, punch levers and transmitters directly coupled with said levers and in combination therewith, an integral or self-contained detachable admeasuring device or unit for limiting the excursions of the units-rack the same being provided with a series of graduated stops and selective actuating devices adapted to be operated upon by a plurality of individual transmitters to effect the same setting.

3. In a composing machine such as described provided with a units-rack, key controlled punch actuating devices and a plurality of transmitters serially arranged and each coupled with the actuating devices of a different punch, and in combination therewith a detachable self contained admeasuring device or unit including a frame, a pivoted units-rack, gaging member, and a key coupled with said gaging member and operated upon by the individual transmitters to vary the angular relation of said gaging member and the travel of the units-rack.

4. An integral admeasuring device or unit for composing machines such as described comprising a frame, a pivoted gaging member provided with a series of stepped gaging surfaces, and a key piece coupled with said gaging member and adapted to be engaged by any one of a series of transmitting members.

5. An integral admeasuring device or unit for the units-rack of a composing machine such as described, the same including in combination the following elements, to wit; a frame; a gaging member pivotally supported on the frame and provided with stepped or graduated gaging surfaces; and a stepped key piece coupled with the axis of said gaging member.

6. An integral admeasuring device or unit for composing machines such as described, the same including, in combination, a plurality of stepped gaging members pivotally supported in a movable frame and each provided with a key piece through which the angular displacement of said gaging member is controlled by the engagement of serially disposed transmitters.

7. An integral admeasuring device or unit adapted for interposition between a series of transmitters carried by the punch levers and the units-rack of a composing machine such as described, the same comprising, in combination, the following elements, to wit; a frame; a plurality of stepped gaging members serially disposed and movable in a plane to present successive gaging surfaces; and a plurality of stepped key pieces, one for each of said gaging members.

FRANK HINMAN PIERPONT.

Witnesses:
R. WESTACOTT,
H. D. JAMESON.